Patent OCR

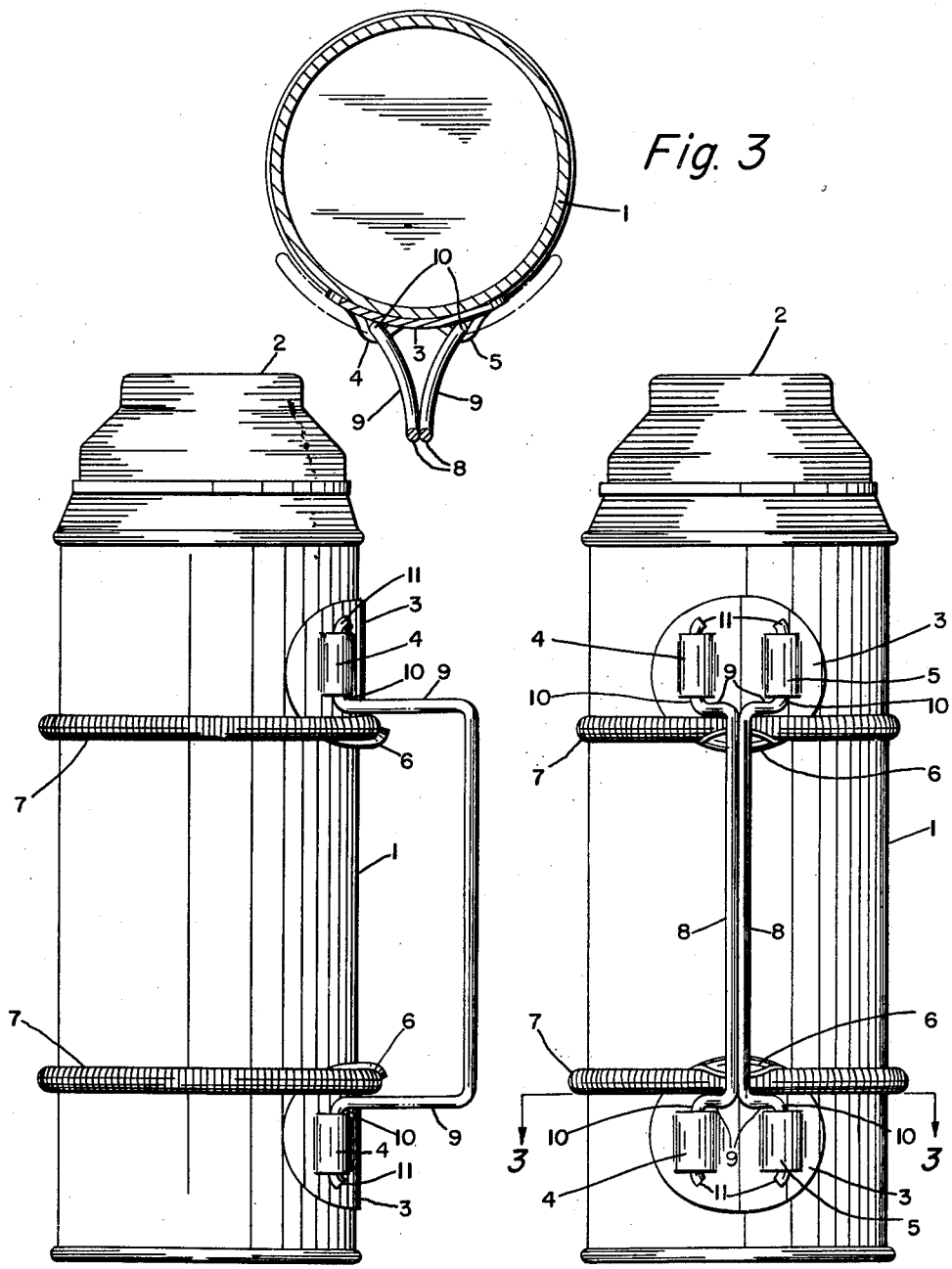

3,073,493
HOLDER FOR CONTAINERS
Edward Pfaffenberger, 5901 Denison Ave.,
Cleveland 2, Ohio
Filed May 18, 1960, Ser. No. 29,987
1 Claim. (Cl. 224—55)

This invention relates generally to holders for containers, but has reference more particularly to holders which are designed particularly for use for holding containers of the vacuum bottle type.

A primary object of the invention is to provide a holder of the character described, which can be easily and quickly attached to the container and as easily and quickly detached or removed therefrom.

Another object of the invention is to provide a holder of the character described, embodying handle members which can be easily and quickly swung into position for use or swung into close engagement with the exterior of the container, whereby the container, with the holder mounted thereon, can be stored or packaged in a minimum of space.

A further object of the invention is to provide a holder of the character described, which consists of a minimum number of parts which can be manufactured at low cost, and quickly and easily assembled.

Other objects and advantages of my invention will be apparent during the course of the following description.

In the accompanying drawings forming a part of this specification, and in which like numerals are employed to designate like parts throughout the same.

FIG. 1 is a side elevational view of a vacuum bottle or container having a preferred form of the holder of the invention mounted thereon;

FIG. 2 is a front elevational view, as viewed from the right side of FIG. 1;

FIG. 3 is a cross-sectional view, taken on the line 3—3 of FIG. 2;

Figure 5:
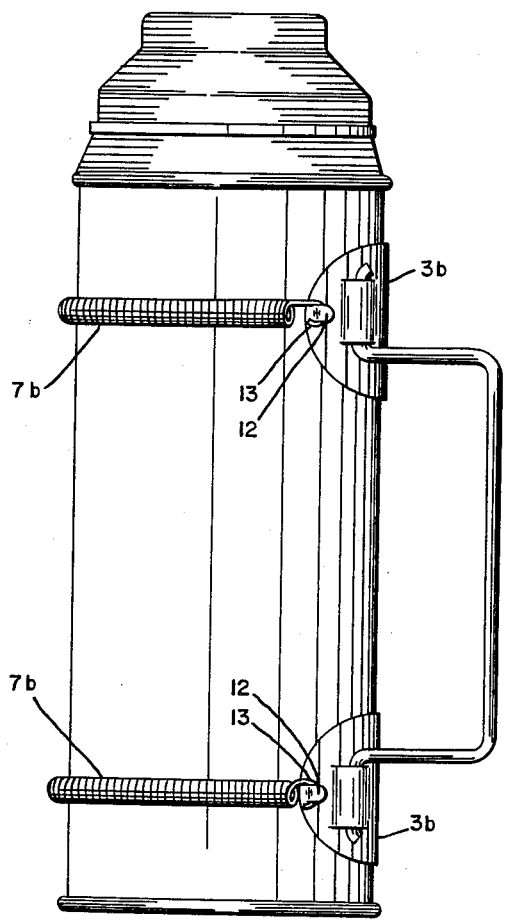
FIG. 5 is a view similar to FIG. 1, but showing another modification of the invention.

Referring more particularly to FIGS. 1, 2 and 3 inclusive of the drawings, reference numeral 1 designates generally a cylindrical vacuum bottle, having a pour opening 2 at its upper end.

For the purpose of holding the bottle 1 at such times when it is desired to drink therefrom or to pour out the contents of the bottle, I have provided a holder, which comprises a pair of vertically-spaced saddle members 3, which are of identical construction, but which, as shown, are in inverted relationship to each other.

Each of the saddle members 3 is of generally circular form, and of arcuate transverse cross-section, so that it snugly engages the exterior wall of the bottle or container 1. Each saddle member is also provided with a pair of spaced protuberances 4 and 5, which are stamped or formed from the material of the saddle member and which protuberances provide vertically-extending open-ended sockets for a purpose to be presently described. Each saddle member, moreover, is provided with a curved lip 6, which is formed integrally with the saddle member, the lip of the upper member being disposed at the lower end of the member and that of the lower member being disposed at the upper end of the member. The lips 6 serve a purpose to be presently described.

For the purpose of retaining the saddle members 3 in engagement with the exterior of the bottle, I have provide a pair of endless flexible resilient coil springs 7, which encircle the bottle and bear against the exterior surface of the saddle members. The upper spring 7 is retained against displacement in a downward direction from the upper saddle member by the engagement of a portion of the spring with the lip 6 of the upper saddle member. Similarly, the lower spring 7 is retained against displacement in an upward direction from the lower saddle member by the engagement of a portion of the spring with the lip 6 of the lower saddle member.

The holder further includes a pair of handle members, each formed of a single length of wire bent to form a bridge portion 8, curved portions 9 at the ends of the bridge portion and disposed in planes perpendicular to the axis of the bridge portion, and terminal portions 10 extending from the ends of the portion 9 and in substantially spaced parallel relation to the portion 9, the portions 10 being in axial alignment with each other. The portions 10 extend into the sockets formed by the protuberances 4 and 5, so as to permanently secure the handle members to the saddle members 3. The ends of the portions 10 are bent, as at 11, to prevent displacement of the handle members from the saddle members.

It is thus seen that I have provided a holder which can be easily and quickly secured to the bottle 1, and as easily and quickly removed therefrom, if necessary.

In securing the holder to the bottle, the springs 7 are first secured to the bottle, after which the unit comprising the saddle members and handle members is positioned against the bottle, as shown in FIGS. 1 and 2. The coil springs 7 are then shifted so as to position them in the position shown in these figures, that is to say, they are shifted to a position in which portions of these springs are embraced by the lips 6 of the saddle members.

In the use of the holder, the handle members, which are pivotally movable in the sockets 4 and 5, are positioned in the position shown in solid lines in FIGS. 1, 2 and 3, in which position the portions 8 of the members are in juxtaposition with each other, so as to facilitate grasping these portions 8 by the person who is about to drink from the bottle or pour out the contents of the bottle.

When the handle members are not in use, they may be swung to a position in which the portions 8 lie against the exterior surface of the bottle. The portions 9 of the handle members are of a curvature which is substantially the same as the curvature of the exterior of the bottle, so that when the portions 8 lie against the bottle, the portions 9 will also lie against and embrace the bottle, as shown in broken lines in FIG. 3. Consequently, the handle members, when not in use, are so positioned that they do not project to any substantial degree beyond the outer surface of the bottle, and this is of advantage in that the holder may be left on the bottle, and the bottle may be stored or placed in a lunch box, for example, in the same space which the bottle itself would occupy.

Figure 4:
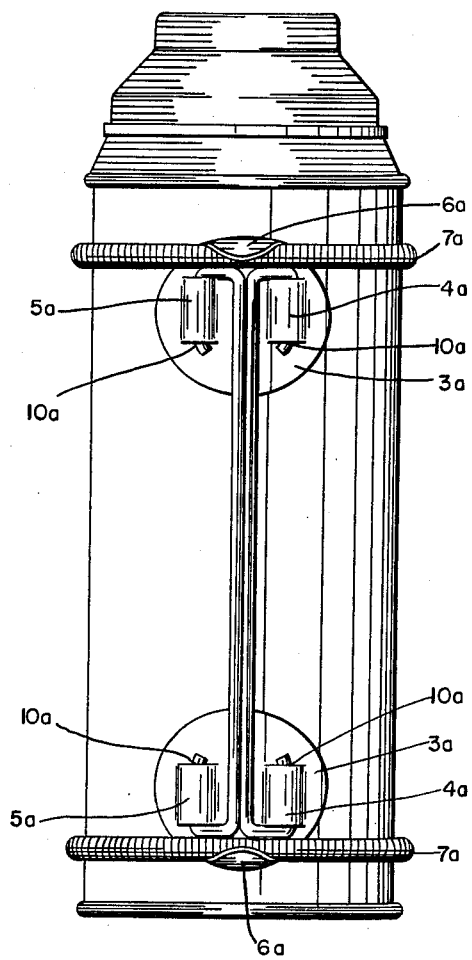
FIG. 4 is a view similar to FIG. 2, but showing a modification of the invention.

In the modification shown in FIG. 4, the saddle members 3a are identical in construction with the saddle members 3, but are utilized in such a manner that the lip 6a of the upper saddle member is positioned at the top of the saddle member, and the lip 6a of the lower saddle member is positioned at the bottom of the saddle member. Moreover, the upper portions 10a of the handle members extend downwardly through the sockets 4a and 5a of the upper saddle member, and the lower portions 10a of the handle members extend upwardly through the sockets 4a and 5a of the lower saddle member. With this arrangement, the unit comprising the saddle members and handle members may be positioned against the bottle, in the desired location, and the springs 7a may then be positioned on the bottle in the manner shown.

In the modification shown in FIG. 5, the saddle members 3b need not be provided with lips, but instead, may be provided with hooks 12 which are formed integrally with the saddle members, and instead of using endless coil springs, similar springs 7b may be used, having loops 13 at their ends, which can be secured to the hooks 12. This modification may also be used in association with that form of the invention shown in FIG. 4.

In all of the forms of the invention which have been disclosed, the inner surfaces of the saddle members may be lined with a layer of fabric, foam rubber, or other soft material, so as to avoid marring or scratching of the exterior surface of the bottle.

It is to be understood that the forms of my invention, herewith shown and described, are to be taken as preferred examples of the same, and that various changes may be made in the shape, size and arrangement of parts thereof, without departing from the spirit of the invention or the scope of the subjoined claim.

Having thus described my invention, I claim:

A holder for cylindrical-shaped vessels comprising a pair of handle members each comprising a substantially U-shaped member havng leg portions and a bridge portion, with the terminal portions of the legs of the U being offset in a direction to lie substantially parallel to the bridge portion of the U, a pair of vertically-spaced saddle members each provided with a pair of laterally-spaced bearing members having generally parallel axes, said bearing members being formed from the material of the saddle members and being open at both ends, said terminal portions at the opposite ends of each handle member being journalled in said bearing members of the respective saddle members and extending entirely through said bearing members, and flexible tension members engaging and detachably secured to the respective saddle members and adapted to embrace a cylindrical-shaped vessel to frictionally engage the saddle members with the exterior surface of said vessel, the ends of said terminal portions being bent to overlie one end of said bearing members, whereby to prevent displacement of the handle members from the saddle members.

References Cited in the file of this patent

UNITED STATES PATENTS

| | | |
|---|---|---|
| 1,825,117 | Hudson | Sept. 29, 1931 |
| 2,484,531 | Simmons | Oct. 11, 1949 |
| 2,516,728 | Smith | July 25, 1950 |
| 2,749,172 | Jacobs | June 5, 1956 |
| 2,922,558 | Harvey | Jan. 26, 1960 |
| 2,947,458 | Troendly | Aug. 2, 1960 |

FOREIGN PATENTS

| | | |
|---|---|---|
| 136,457 | Australia | Feb. 21, 1950 |